United States Patent [19]
Gonidec et al.

[11] Patent Number: 5,974,783
[45] Date of Patent: Nov. 2, 1999

[54] TURBOJET ENGINE THRUST REVERSER HAVING MOVABLE REAR BAFFLE PIVATTALLY CONNECTED BY FORWARD AND REAR LINKRODS WHICH ARE TOTALLY ENCLOSED IN THE FORWARD THRUST MODE

[75] Inventors: Patrick Gonidec, Montivilliers; Guy Bernard Vauchel, Le Havre, both of France

[73] Assignee: Societe Hispano-Suiza, Paris, France

[21] Appl. No.: 08/997,241

[22] Filed: Dec. 23, 1997

[30] Foreign Application Priority Data

Dec. 26, 1996 [FR] France ................ 96.16030

[51] Int. Cl.⁶ .............. F02K 1/54; F02K 3/02
[52] U.S. Cl. ............. 60/226.2; 60/230; 244/110 B; 239/265.27
[58] Field of Search .............. 60/226.2, 230, 60/271; 239/265.27, 265.29, 265.31, 265.19; 244/110 B

[56] References Cited

U.S. PATENT DOCUMENTS

| | | | |
|---|---|---|---|
| 3,844,482 | 10/1974 | Stearns | 60/230 |
| 3,915,415 | 10/1975 | Pazmany | 60/226.2 |
| 4,030,687 | 6/1977 | Hapke | 239/265.19 |
| 4,216,926 | 8/1980 | Lawson . | |
| 4,545,199 | 10/1985 | Sankey et al. . | |
| 4,698,964 | 10/1987 | Glancy . | |
| 4,858,430 | 8/1989 | Belbouche . | |
| 4,865,256 | 9/1989 | Durand et al. | 239/265.39 |
| 4,894,985 | 1/1990 | Dubois et al. . | |
| 4,914,905 | 4/1990 | Dubois et al. . | |
| 4,916,895 | 4/1990 | Dubois . | |
| 4,960,243 | 10/1990 | Dubois et al. . | |
| 4,976,466 | 12/1990 | Vauchel . | |
| 5,039,171 | 8/1991 | Lore . | |
| 5,090,197 | 2/1992 | Dubois . | |
| 5,343,696 | 9/1994 | Rohra et al. . | |
| 5,615,549 | 4/1997 | Valleroy . | |
| 5,722,231 | 3/1998 | Porte | 60/226.2 |
| 5,775,097 | 7/1998 | Lardy et al. | 60/226.2 |

FOREIGN PATENT DOCUMENTS

| | | |
|---|---|---|
| 414 609 | 2/1991 | European Pat. Off. . |
| 2 618 852 | 2/1989 | France . |
| 2 618 853 | 2/1989 | France . |
| 2 621 082 | 3/1989 | France . |
| 2 627 807 | 9/1989 | France . |
| 2 634 251 | 1/1990 | France . |
| 2 638 207 | 4/1990 | France . |
| 2 648 869 | 12/1990 | France . |
| 2650861 | 2/1991 | France ............ 60/226.2 |
| 2 651 021 | 2/1991 | France . |
| 2 722 534 | 1/1996 | France . |
| 2 045 179 | 10/1980 | United Kingdom . |
| WO 92/10660 | 6/1992 | WIPO . |

*Primary Examiner*—Ted Kim
*Attorney, Agent, or Firm*—Bacon & Thomas, PLLC

[57] ABSTRACT

A thrust reverser is disclosed for a turbofan type turbojet engine assembly with a cowling having an inner cowling surface forming an outer boundary of a gas flow duct, and an outer cowling surface spaced from the inner cowling surface, the inner and outer cowling surfaces joining at a rearmost edge of the cowling, the thrust reverser having a thrust reverser baffle with an outer baffle surface and an inner baffle surface, a forward linkrod pivotally connected to a forward portion of a thrust reverser baffle and to the cowling, and a rear linkrod pivotally connected to the thrust reverser baffle and to the cowling. The thrust reverser baffle is movable between a forward thrust position wherein the outer baffle surface is substantially flush with the outer cowling surface, a forward portion of the thrust reverser baffle covering an inner rear cowling portion having the inner cowling surface, and a reverse thrust position in which the reverse thrust baffle is disposed rearwardly of the rearmost cowling edge so as to redirect gases flowing through the gas flow duct. When in the forward thrust position, the forward and rear linkrods are totally enclosed between the spaced apart inner and outer cowling surfaces.

7 Claims, 9 Drawing Sheets

TURBOJET ENGINE THRUST REVERSER HAVING MOVABLE REAR BAFFLE PIVATTALLY CONNECTED BY FORWARD AND REAR LINKRODS WHICH ARE TOTALLY ENCLOSED IN THE FORWARD THRUST MODE

BACKGROUND OF THE INVENTION

The present invention relates to a thrust reverser for a turbojet engine having a thrust reverser baffle movable to the rear of an engine cowling assembly to redirect gases emanating from the cowling into a reverse thrust direction.

Turbofan-type turbojet engines are well known in the art and typically comprise a fan at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion from the turbojet engine, or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

Figure 1:
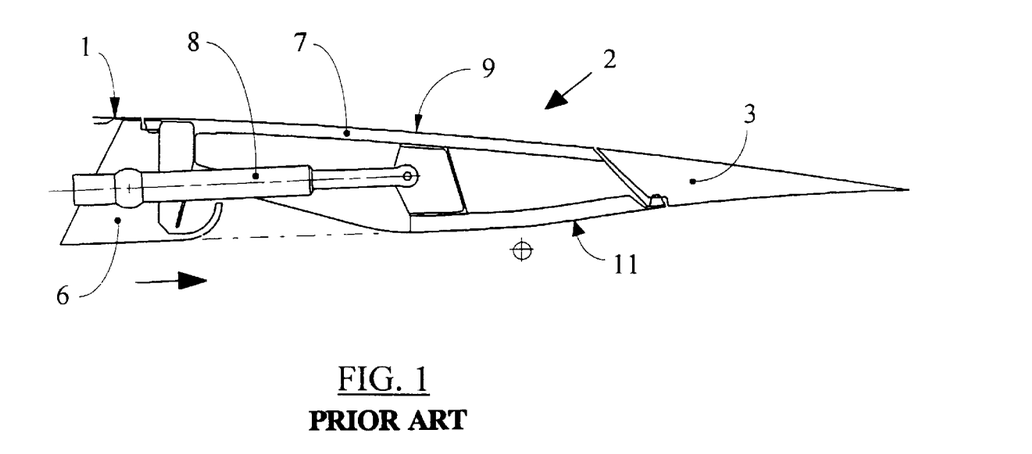
FIG. 1 is a partial, longitudinal, cross-sectional view taken view of a known type of thrust reverser.
Figure 2:
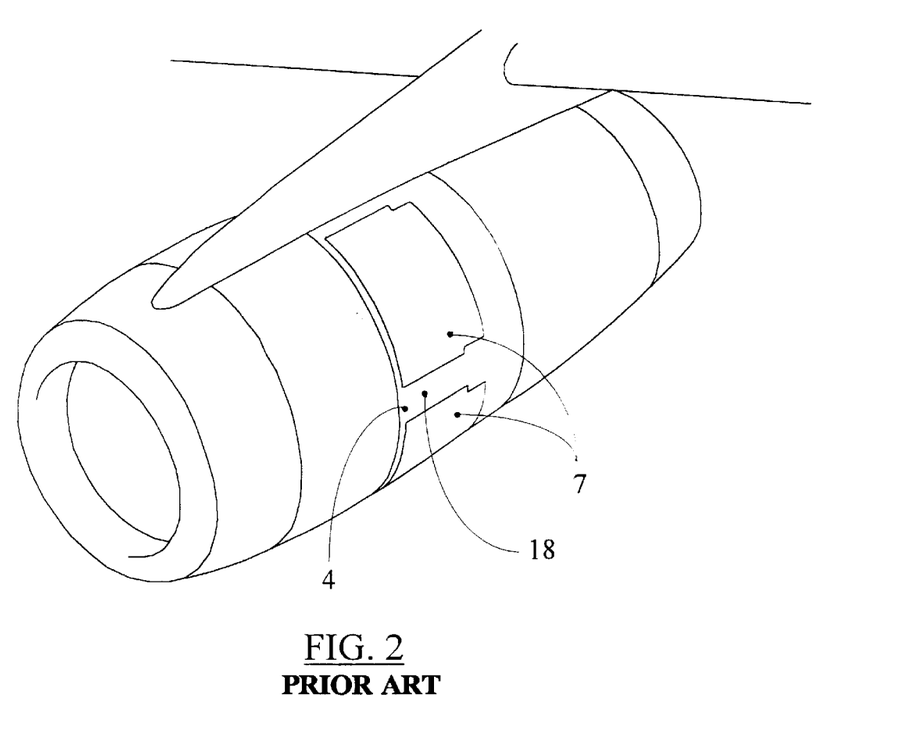
FIG. 2 is a perspective view of an engine cowling incorporating the thrust reverser of FIG. 1.

FIGS. 1 and 2 illustrate a known pivoting door-type thrust reverser associated with the cowling of a turbofan-type turbojet engine. As illustrated in FIG. 1, the upstream portion of the cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct through which the bypass flow passes in the direction of the arrow.

The cowling also comprises a thrust reverser 2 and a downstream cowling portion 3. The thrust reverser 2 comprises a door 7 pivotally attached to the cowling so as to pivot about a transverse axis such that it is movable between a closed, forward thrust position, illustrated in FIG. 1, and an open, reverse thrust position, in which the forward end (towards the left as viewed in FIG. 1) of the thrust reverser door 7 is moved outwardly from the cowling, while a rear portion is moved inwardly into the bypass flow duct so as to redirect at least a portion of the bypass flow through an opening in the cowling in a direction that has a reverse thrust component.

A known actuator 8 for moving the door 7 between its forward thrust and reverse thrust positions may comprise a hydraulic cylinder extending through and mounted to the frame 6, and having an extendible and retractable piston rod connected to the thrust reverser door 7.

The thrust reverser door 7 has an outer panel 9, an inner door panel 11 and the forward end of the door 7 may have a deflector to maximize the efficiency of the thrust reverser when the door 7 is in the reverse thrust position. The inner surface 11 tapers toward the outer surface of the door 7 at the forward end of the door, forming a cavity when in the forward thrust position.

A plurality of thrust reverser doors 7 may be incorporated into the cowling, such doors being circumferentially spaced around the periphery of the cowling as illustrated in FIG. 2. A portion 18 of the cowling extends axially between a forward part 4 and a rear part of the cowling adjacent thrust reverser doors 7 to provide structural rigidity to the cowling and to provide pivot mounting points for attaching the doors 7 to the cowling. French Patents 2,618,853; 2,618,852; 2,621,082; 2,627,807; 2,634,251; 2,638,207; and 2,651,021 illustrate typical, known thrust reversers.

In some applications, installation of a known type of thrust reverser raises substantial difficulties and may, for all practical purposes, be impossible. These difficulties arise in turbofan engines having a very high bypass ratio and which incorporate a fan cowling having a short axial length compared to the axial length of the jet engine cowling. In these instances the use of such an axially short fan cowling produces a relatively short bypass flow duct and renders the use of such known type of thrust reversers virtually impossible.

French Patent 2,722,534 discloses a thrust reverser for a turbofan type turbojet engine attached to the cowling assemblies by linkrods. This known design entails the drawback of positioning a downstream or rear linkrod in the acceleration zone of the gas flow inside the bypass flow duct and, in particular, in a zone where the linkrod pivots on the jet engine cowl. Since the speed of the gas flow is close to, or exceeds the speed of sound during aircraft cruising flight, the location of this linkrod causes substantial aerodynamic disturbances. Moreover, further aerodynamic losses are caused by notching or embossing the thrust reverser baffle or the associated fixed cowling structure to allow the displacement of the rear linkrod during movement of the baffle between the forward and reverse thrust positions. Another drawback is caused by stops which must be mounted on the engine cowling structure to retain the rearmost edge of the thrust reverser baffle on the engine cowling when the baffle is in the reverse thrust position. Consequently, when the baffle is moved to the forward thrust position, these stops project beyond the engine cowling surface causing further aerodynamic disturbances.

SUMMARY OF THE INVENTION

A thrust reverser is disclosed for a turbofan type turbojet engine assembly with a cowling having an inner cowling surface forming an outer boundary of a gas flow duct, and an outer cowling surface spaced from the inner cowling surface, the inner and outer cowling surfaces joining at a rearmost edge of the cowling, the thrust reverser having a thrust reverser baffle with an outer baffle surface and an inner baffle surface, a forward linkrod pivotally connected to a forward portion of a thrust reverser baffle and to the cowling, and a rear linkrod pivotally connected to the thrust reverser baffle and to the cowling. The thrust reverser baffle is movable between a forward thrust position wherein the outer baffle surface is substantially flush with the outer cowling surface, a forward portion of the thrust reverser baffle covering an inner rear cowling portion having the inner cowling surface, and a reverse thrust position in which the reverse thrust baffle is disposed rearwardly of the rearmost cowling edge so as to redirect gases flowing through the gas flow duct. When in the forward thrust position, the forward and rear linkrods are totally enclosed between the spaced apart inner and outer cowling surfaces.

The thrust reverser according to the present invention enables the displacement of the thrust reverser baffle between the forward and reverse thrust positions without the necessity of utilizing a notch or an embossment in either the thrust reverser baffle or the fixed cowling structure so as to avoid the aerodynamic disturbances caused by the known structures when in the forward thrust mode.

DETAILED DESCRIPTION OF THE PREFERRED EMBODIMENTS

Figure 3:
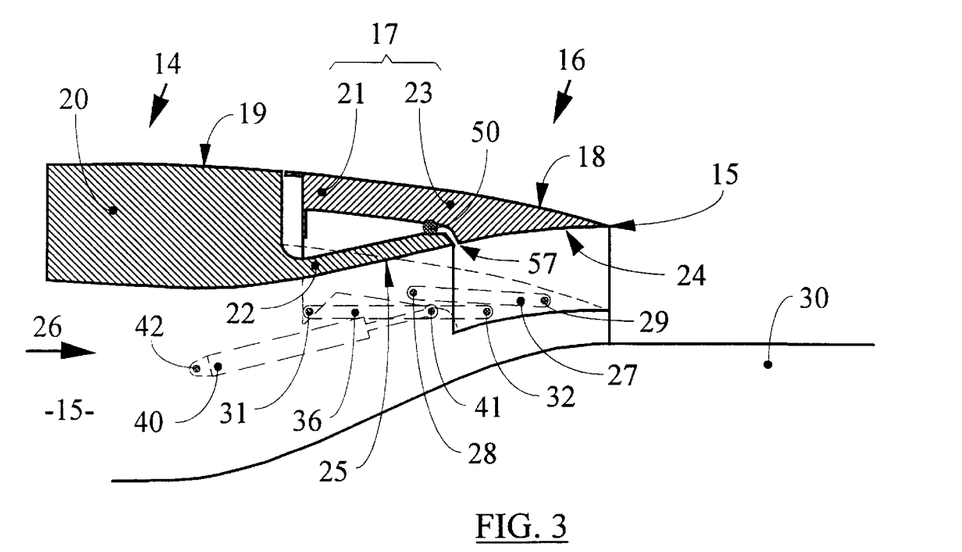
FIG. 3 is a partial, longitudinal, cross-sectional view of a thrust reverser according to the present invention with the thrust reverser baffle in the forward thrust position.
Figure 4:
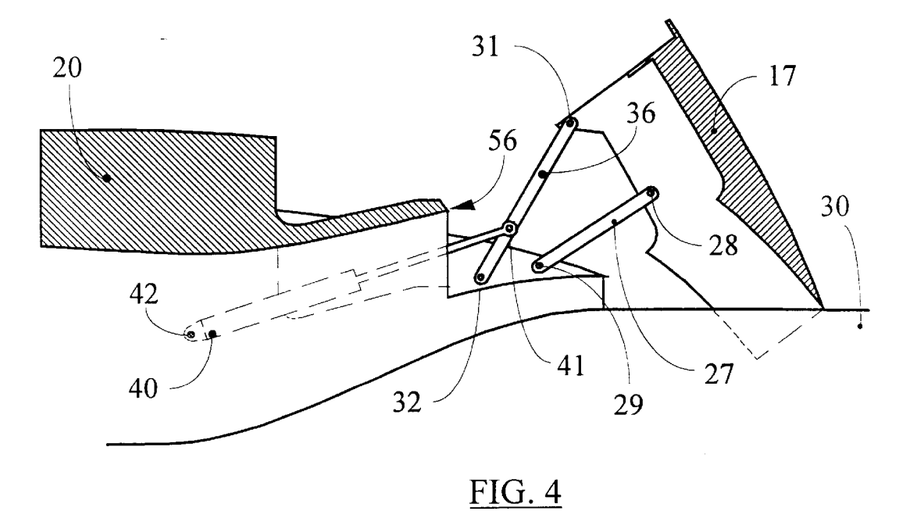
FIG. 4 is a view similar to FIG. 3 illustrating the thrust reverser baffle in the reverse thrust position.
Figure 5:
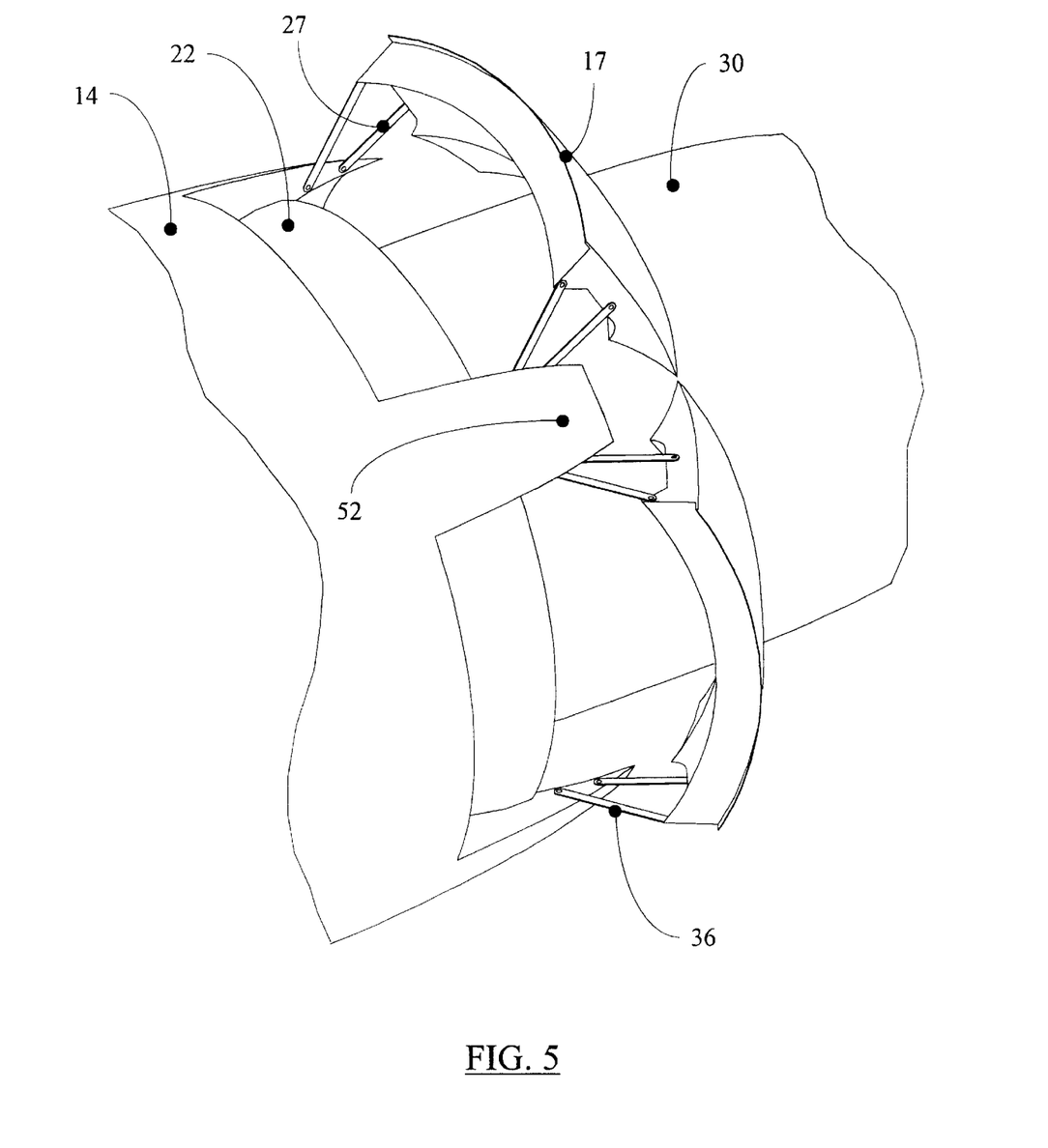
FIG. 5 is a partial, perspective view of an engine cowling assembly incorporating a thrust reverser according to the present invention, illustrating the thrust reverser baffles in their reverse thrust positions.

As best illustrated in FIGS. 3–5, a first embodiment of the present invention is associated with a cowling 14 and comprises a thrust reverser 16 of which the movable portion has a plurality of displaceable thrust reverser baffles. It is to be understood that, depending upon the desired parameters of each specific application, the number of thrust reverser baffles may vary without exceeding the scope of this invention. The thrust reverer baffle 17 has an outer baffle surface 18 which, in the forward thrust position illustrated in FIG. 3, is substantially flush with the outer cowling surface 19 so as to provide minimal disturbance to the air passing over the exterior of the cowling assembly. A forward portion 21 of the thrust reverser baffle 17 externally covers a rear portion 22 of the fixed cowling structure 20. The rear edge 15 of the thrust reverser baffle 17 forms a portion of the exhaust gas opening of the bypass gas flow duct 13. A rear portion 23 of the thrust reverser baffle 17 is located as a rear extension of the fixed cowling structure cowling 20. The inner surface 24 of the rear baffle portion 23 is substantially flush with the inner cowling surface of the rear portion 22 of the fixed cowling structure 20 and, when the baffle 17 is in the forward thrust position, inner baffle surface 24 forms a portion of the outer boundary of the bypass gas flow duct 13, through which gases move in the direction of arrow 26.

The thrust reverser baffle 17 is connected to the cowling assembly 14 by at least one front linkrod 36 and at least one rear linkrod 27. As can be seen, front and rear linkrods 36 and 27 are pivotally connected, in this particular embodiment, to a lateral sidewall of the thrust reverser baffle 17 by pivots 31 and 28. The linkrods 36 and 27 are also connected to longitudinally extending beams 52 (see FIG. 5) by pivots 32 and 29. When the thrust reverser is in the forward thrust mode, as illustrated in FIG. 3, the forward and rear linkrods 36 and 27 are situated within the radial space between the inner and outer cowling surfaces.

A linear actuator 40 is affixed to the fixed cowling structure 20 at pivot point 42 and has an extendible and retractable piston rod acting on the thrust reverser baffle 17 by attachment to the forward linkrod 36 at pivot 41. Thus, extension and retraction of the actuator rod causes movement of the thrust reverser baffle 17 between the forward and reverse thrust positions. Although a single actuator 40 is illustrated, it is to be understood that more than this number may be associated with the thrust reverser baffle 17 without exceeding the scope of this invention. Alternatively, the extendible and retractable actuator rod may be connected to the rear linkrod 27 if desired so as to move the thrust reverser baffle between the forward and reverse thrust positions. Alternatively, a single actuator 40 may be located within the longitudinally extending beams 52 and may be connected so as to actuate adjacent thrust reverer baffles 17 by a single actuator.

As illustrated in FIGS. 3 and 4, extension of the actuator rod causes forward linkrod 36 to pivot clockwise about its pivot attachment 32 to drive the thrust reverser baffle 17 towards the reverse thrust position. The orientation of the thrust reverser baffle when in the reverse thrust position may be varied for particular applications by changing the respective lengths of the forward and reverse linkrods, andor their relative angular orientation. Additionally, the attachment points 32 and 29 may be changed to vary the angular orientation of the thrust reverser baffle 17 as well as the opening distance between the baffle and the rearmost edge of the cowling.

Deflection edge 56 may be configured to facilitate the flow of gases when the thrust reverser baffle 17 is in the reverse thrust position. The edge 57 of the inner baffle surface 24 located adjacent to the deflection edge 56 when the thrust reverser baffle 17 is in the forward thrust position is configured to conform to the configuration of the deflection edge 56.

A seal 50 may be located between the rear cowling portion 22 and the thrust reverser baffle 17 so as to prevent the pressurized gases within the gas flow duct 13 from acting on the forward portion 21 of the thrust reverser baffle 17 when the baffle is in the forward thrust position. This minimizes the forces acting on the thrust reverser baffle urging it away from the forward thrust position.

In the forward thrust position, the baffles 17 are locked in place by known locking devices which may act on the forward linkrod 36, the rear linkrod 27 or directly on the thrust reverser baffle 17 in known fashion. When in the reverse thrust position, the rear edge 15 of the thrust reverser baffle 17 may rest against the engine cowling 30, or the actuator 40 may be such that, at the limit of its actuator rod extension, the rear edge 15 is slightly spaced from the engine cowling 30.

Figure 6:
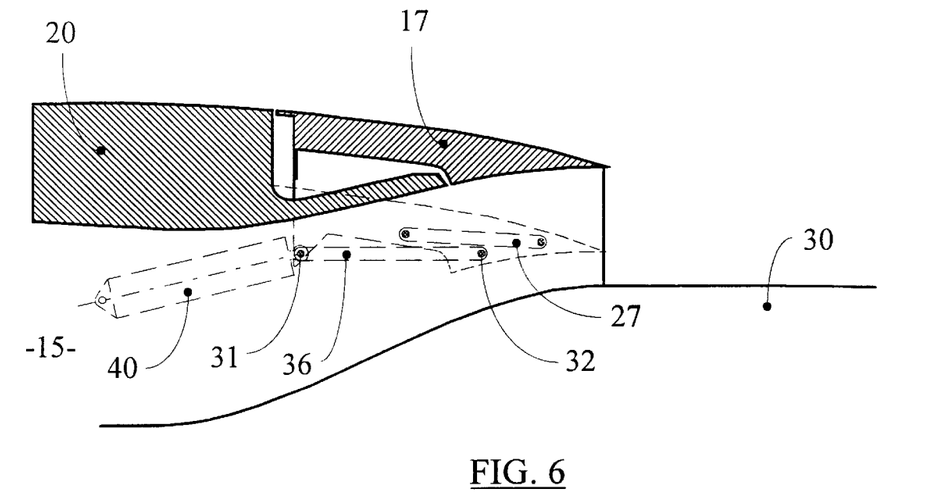
FIG. 6 is a partial, longitudinal cross-sectional view of a thrust reverser according to the present invention illustrating a variation of the attachment between the actuator and the thrust reverser baffle.
Figure 7:
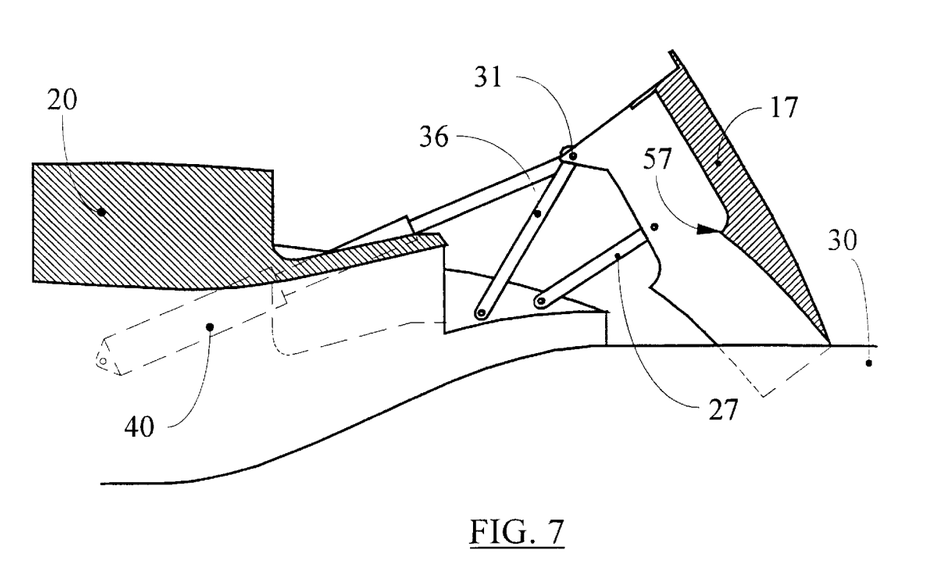
FIG. 7 is a view similar to FIG. 6 illustrating the thrust reverser baffle in the reverse thrust position.

FIGS. 6 and 7 illustrate a variation of the thrust reverser illustrated in FIGS. 3–5. In this variation, the extendible and retractable rod of the actuator 40 is connected to the thrust reverser baffle 17 at the pivot 31 joining the forward linkrod 36 to the thrust reverser baffle 17. It is to be understood that the actuator rod could also be connected to the pivot attachment between the rear linkrod 27 and the thrust reverser baffle 17. The functions of the respective elements in this variation are identical to those in the previously described thrust reverser.

Figure 8:
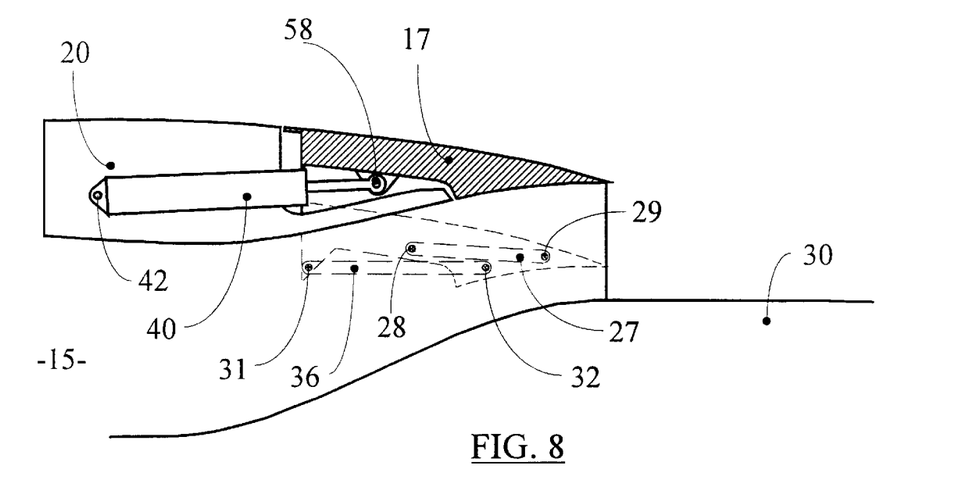
FIG. 8 is a partial, longitudinal, cross-sectional view of a thrust reverser according to the present invention illustrating a second variation of the attachment between the actuator and the thrust reverser baffle.
Figure 9:
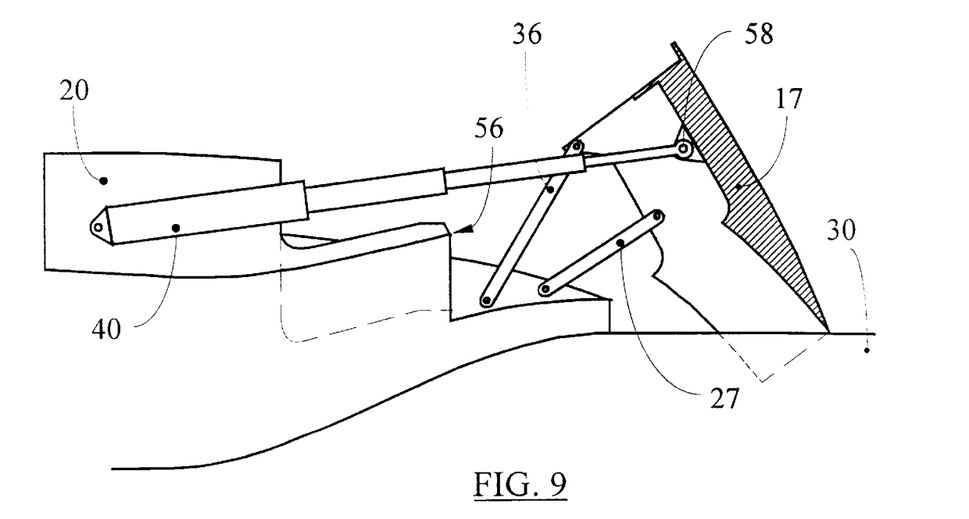
FIG. 9 is a view similar to FIG. 8 illustrating the thrust reverser baffle in the reverse thrust position.

Another variation of the attachment between the thrust reverser baffle 17 and the extendible and retractable rod of the actuator 40 is illustrated in FIGS. 8 and 9. In this variation, the rod is directly attached to the thrust reverser baffle 17 at pivot 58. The pivot 58 is located on the inner baffle surface and is longitudinally located between the forward edge and a center of the baffle 17. Again, the operation of the elements illustrated in FIGS. 8 and 9 is identical to the operation of the elements previously described.

Figure 10:
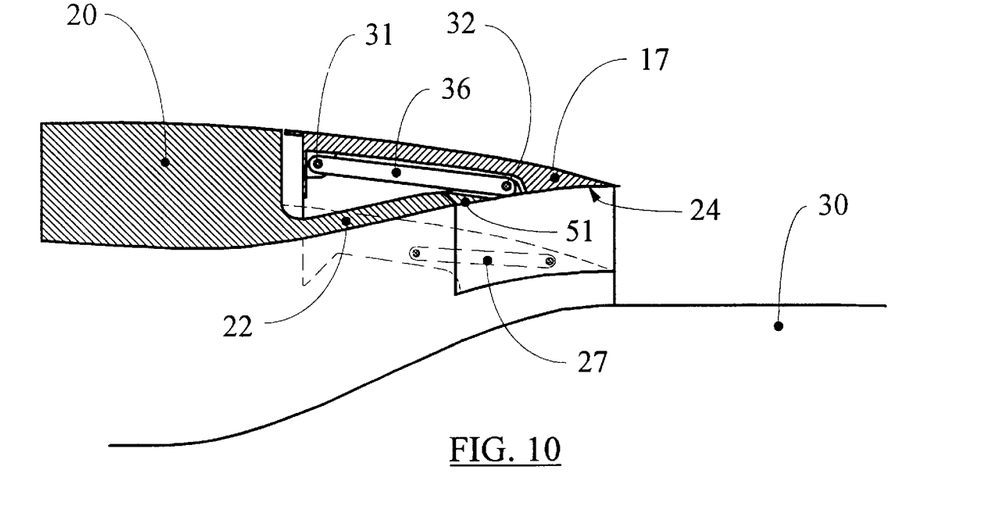
FIG. 10 is a partial, longitudinal, cross-sectional view of an alternative embodiment of the present invention with the thrust reverser baffle in the forward thrust position.
Figure 11:
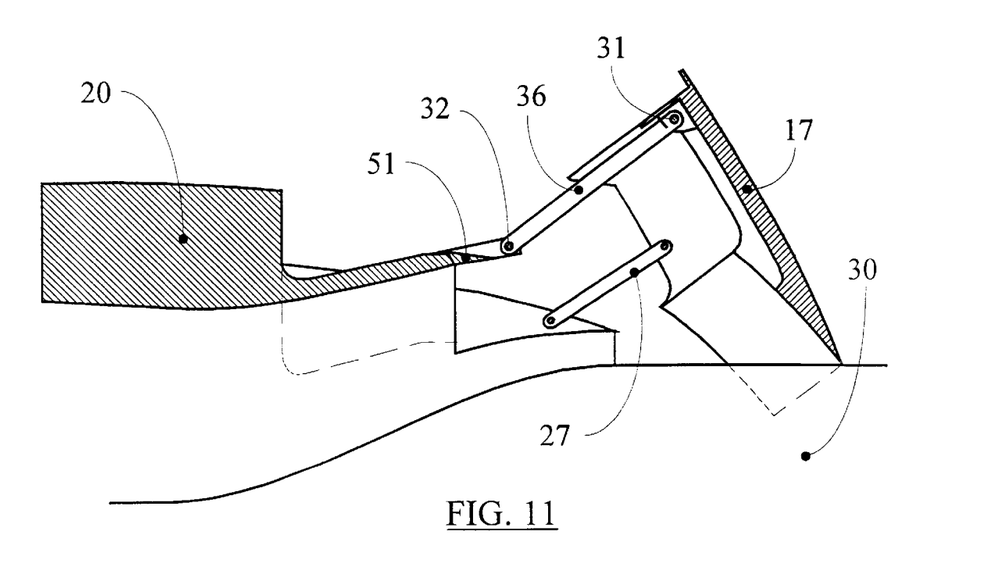
FIG. 11 is a view similar to FIG. 10 illustrating the thrust reverser baffle in the reverse thrust position.

In the variation illustrated in FIGS. 10 and 11, the forward linkrod 36 is centrally located between the opposite lateral sides of the thrust reverser door 17 rather than being attached to the lateral sides as illustrated in the previous variations. The pivot 32 attaching the forward linkrod 36 to the fixed cowling structure 20 is located on a projection 51 extending rearwardly from the inner rear cowling portion 22 of the fixed cowling structure 20. Although a single, centrally located forward linkrod 36 is illustrated, it is to be understood that more than one linkrod may be utilized, the plurality of linkrods being positioned between the opposite lateral sides of the thrust reverser baffle 17. The pivot 31 is located adjacent to a forward side of the thrust reverser baffle 17. The displacement of the thrust reverser baffle between the forward and reverse thrust positions is achieved by a linear actuator as in the previously described embodiments. If the pivot 32 is located as rearwardly as possible relative to the inner baffle surface 24, the forces acting on the thrust reverser baffle due to the pressurized gases within the gas flow duct 13 will urge the thrust reverser baffle toward its forward thrust position, thereby making the thrust reverser self-closing.

The baffle 17 is locked in the forward thrust position by one or more known locks. A known system, such as a cam drive, may be utilized to make the pivot 32 or the pivot 29 displaceable thereby allowing the rear portion of the baffle to be movable so as to provide a variable geometry exhaust nozzle combined with the thrust reverser when the baffle is in the forward thrust position.

Figure 12:
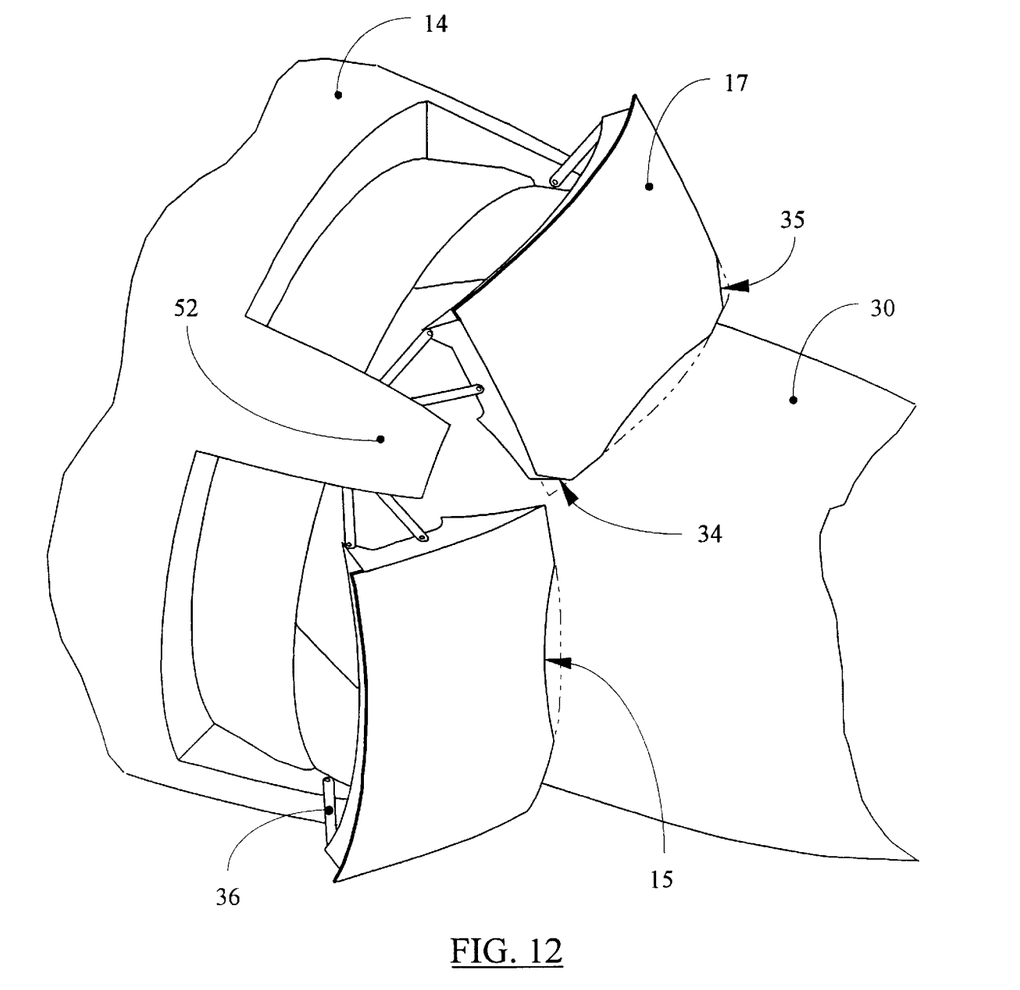
FIG. 12 is a partial, perspective view of the thrust reverser according to the present invention with the thrust reverser baffles in their reverse thrust positions illustrating a rear edge configuration conforming to the outer surface of the engine cowling.

FIG. 12 illustrates the thrust reverser baffles 17 in their reverse thrust positions, the rear edges 15 of the baffles 17 being configured to conform to the outer surface of the engine cowling 30 in order to minimize the leakage of the reverse thrust gases between the baffles and the engine cowling. The thrust reverser baffle 17 may also have beveled corners, such as at 34 and 35 to control the magnitude of flow of the reverse thrust gases, in particular controlling the ratio of the reverse thrust to the residual forward thrust.

Figure 13:
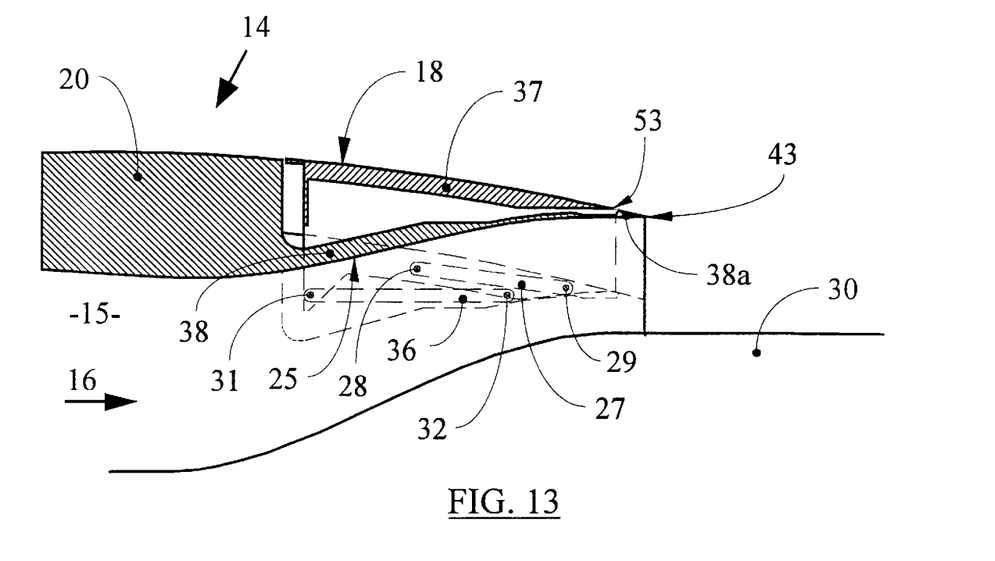
FIG. 13 is a partial, longitudinal, cross-sectional view of an alternative embodiment of the present invention with the thrust reverser baffle in the forward thrust position.
Figure 14:
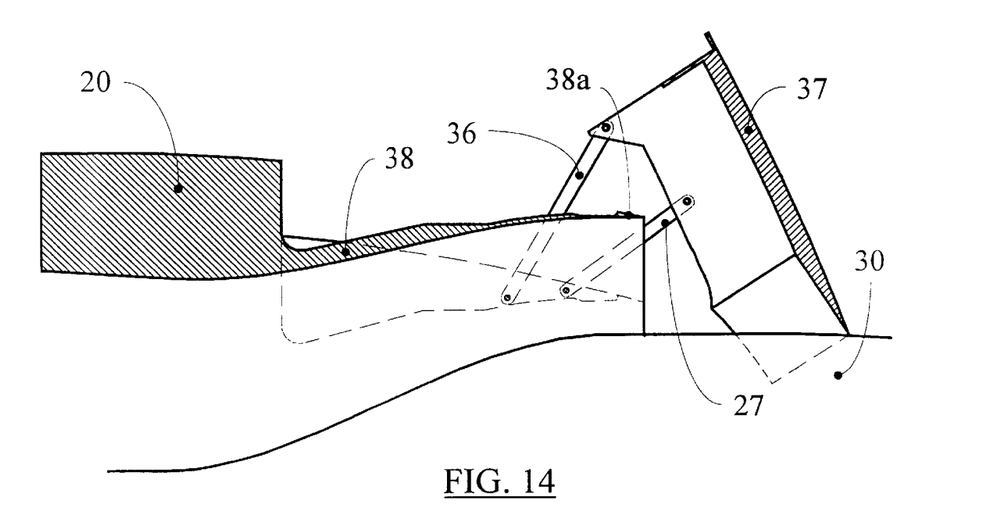
FIG. 14 is a view similar to 13 illustrating the thrust reverser baffle in the reverse thrust position.

FIGS. 13 and 14 illustrate an alternative embodiment of the present invention wherein the thrust reverser baffle 37 covers the exterior portion of the inner rear cowling portion 38 extending rearwardly from the fixed cowling structure 20. The inner cowling surface 25 on the rear portion 38 extends to the rear of the cowling and has fixed portion 38*a* having rear cowling edge 43. Rear edge 43 constitutes a rearmost edge of the cowling when the thrust reverser baffle 37 is in both the forward and reverse thrust positions. In this embodiment, the rear edge 53 of the thrust reverser baffle 37 may be configured to have a desired relationship with the engine cowling 30 when the baffle 37 is in the reverse thrust position without affecting the rear edge of the cowling, which is formed by rear edge 43.

Figure 15:
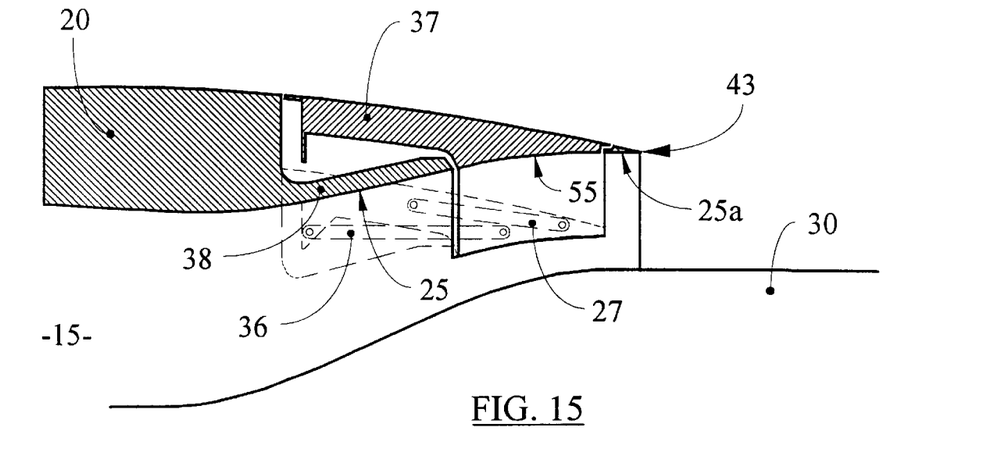
FIG. 15 is a partial, longitudinal, cross-sectional view of an alternative embodiment of the present invention with the thrust reverser baffle in the forward thrust position.
Figure 16:
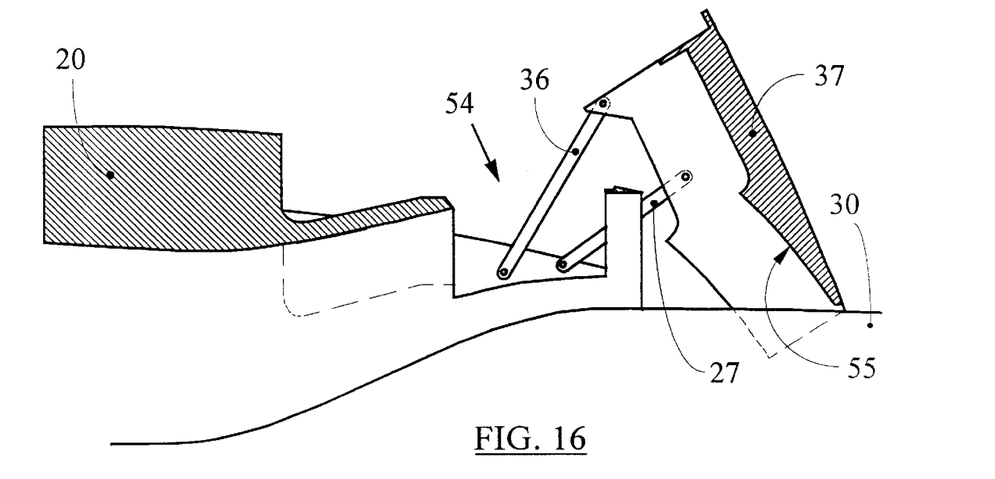
FIG. 16 is a view similar to FIG. 15 illustrating the thrust reverser baffle in the reverse thrust position.

FIGS. 15 and 16 illustrate a variation of the embodiment illustrated in FIGS. 13 and 14 in which one or more openings 54 are formed in the rear portion 38 in communication with the bypass gas flow duct 13 so as to enlarge the gas flow passageway when in the reverse thrust position. The openings 54 are sealed when the baffle 37 is in the forward thrust position by baffle portion 55 which comprises a surface that is substantially flush with the inner cowling surface 25 when the baffle 37 is in the forward thrust position. Openings 54 may assume any number and configuration depending upon the desired parameters of the reverse thrust gases.

The foregoing description is provided for illustrative purposes only and should not be construed as in any way limiting this invention, the scope of which is defined solely by the appended claims.

We claim:

1. A thrust reverser for a turbojet engine assembly with a cowling having an inner cowling surface forming an outer boundary of a gas flow duct, and an outer cowling surface spaced from the inner cowling surface, the inner and outer cowling surfaces each having a rear edge with the rear edge of the inner cowling surface extending more rearwardly than the rear edge of the outer cowling surface to form an inner rear cowling portion, the cowling having at least one longitudinal beam extending rearwardly beyond at least the rear edge of the outer cowling surface, the cowling having a rearmost edge, the thrust reverser comprising:

a) at least one thrust reverser baffle having an outer baffle surface and an inner baffle surface;

b) at least one forward linkrod pivotally connected to a forward portion of the at least one thrust reverser baffle and to the cowling;

c) at least one rear linkrod pivotally connected to the at least one thrust reverser baffle and to the cowling, the at least one rear linkrod being located rearwardly of the at least one forward linkrod; and, d) a linear actuator having an extendable and retractable rod which is connected to one of the at least one forward and rear linkrods; whereby the at least one thrust reverser baffle is movable, by movement of the rod of the linear actuator, between a forward thrust position, in which the outer baffle surface is substantially flush with the outer cowling surface and at least a forward portion of the at least one thrust reverser baffle covers the inner rear cowling portion with the at least one forward and rear linkrods totally enclosed between the inner rear cowling portion and the outer surface of the at least one thrust reverser baffle and between the at least one longitudinal beam and the at least one thrust reverser baffle, and a reverse thrust position, in which the at least one reverse thrust baffle is disposed rearwardly of the rearmost cowling edge so as to redirect gases flowing through the gas flow duct.

2. The thrust reverser of claim 1 wherein the actuator rod is connected to one of the at least one forward and rear linkrods between attachment points of the linkrod to the cowling and to the at least one thrust reverser baffle.

3. The thrust reverser of claim 1 wherein the actuator is connected to the inner rear cowling portion covered by the at least one thrust reverser baffle when in the forward thrust position.

4. The thrust reverser of claim 1 wherein the at least one forward and at least one rear linkrods are located on a lateral side of the at least one thrust reverser baffle.

5. The thrust reverser of claim 1 wherein the at least one forward linkrod is pivotally connected to the inner rear cowling portion covered by the at least one thrust reverser door when in the forward thrust position.

6. The thrust reverser of claim 1 wherein the inner rear cowling portion includes the rearmost edge of the cowling.

7. The thrust reverser of claim 6 further comprising at least one opening through the inner rear cowling portion communicating with the gas flow duct.

* * * * *